United States Patent
Scheck et al.

(10) Patent No.: US 12,434,432 B2
(45) Date of Patent: Oct. 7, 2025

(54) METHOD AND APPARATUS FOR PRODUCING 3D SHAPED ARTICLES USING HIGH-PERFORMANCE RADIATION EMITTERS

(71) Applicant: Voxeljet AG, Friedberg (DE)

(72) Inventors: Christoph Scheck, Augsburg (DE); Melanie Weigel, Augsburg (DE); Alexander Franz Fuchs, Gersthofen (DE)

(73) Assignee: VOXELJET AG, Friedberg (DE)

( * ) Notice: Subject to any disclaimer, the term of this patent is extended or adjusted under 35 U.S.C. 154(b) by 320 days.

(21) Appl. No.: 17/765,591

(22) PCT Filed: Oct. 8, 2020

(86) PCT No.: PCT/DE2020/000235
§ 371 (c)(1),
(2) Date: Mar. 31, 2022

(87) PCT Pub. No.: WO2021/069003
PCT Pub. Date: Apr. 15, 2021

(65) Prior Publication Data
US 2022/0402203 A1  Dec. 22, 2022

(30) Foreign Application Priority Data
Oct. 11, 2019  (DE) .......................... 102019007073.9

(51) Int. Cl.
*B29C 64/165* (2017.01)
*B29C 64/282* (2017.01)
(Continued)

(52) U.S. Cl.
CPC .......... *B29C 64/165* (2017.08); *B29C 64/282* (2017.08); *B29C 64/286* (2017.08);
(Continued)

(58) Field of Classification Search
CPC ... B29C 64/165; B29C 64/282; B29C 64/286; B29C 64/291; B29C 64/30;
(Continued)

(56) References Cited

U.S. PATENT DOCUMENTS

| | | |
|---|---|---|
| 4,247,508 A | 1/1981 | Housholder |
| 4,575,330 A | 3/1986 | Hull |

(Continued)

FOREIGN PATENT DOCUMENTS

| | | |
|---|---|---|
| AU | 720255 B2 | 5/2000 |
| CN | 101146666 A | 3/2008 |

(Continued)

OTHER PUBLICATIONS

US 4,937,420 A, 06/1990, Deckard (withdrawn)
(Continued)

*Primary Examiner* — Philip C Tucker
*Assistant Examiner* — Jimmy R Smith, Jr.
(74) *Attorney, Agent, or Firm* — The Dobrusin Law Firm, P.C.

(57) ABSTRACT

The invention relates to a method and an apparatus for producing three-dimensional models using a radiation-emitting set and optionally a specific arrangement of radiation-emitting units.

20 Claims, 7 Drawing Sheets

(51) Int. Cl.
*B29C 64/286* (2017.01)
*B29C 64/291* (2017.01)
*B29C 64/30* (2017.01)
*B33Y 10/00* (2015.01)
*B33Y 30/00* (2015.01)

(52) U.S. Cl.
CPC ............ *B29C 64/291* (2017.08); *B29C 64/30* (2017.08); *B33Y 10/00* (2014.12); *B33Y 30/00* (2014.12)

(58) Field of Classification Search
CPC ... B29C 64/129; B29C 64/135; B29C 64/264; B29C 64/268; B29C 64/273; B29C 64/277; B29C 71/04; B33Y 10/00; B33Y 30/00; Y02P 10/25
See application file for complete search history.

(56) References Cited

U.S. PATENT DOCUMENTS

| | | |
|---|---|---|
| 4,665,492 A | 5/1987 | Masters |
| 4,752,352 A | 6/1988 | Feygin |
| 4,752,498 A | 6/1988 | Fudim |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,059,266 A | 10/1991 | Yamane et al. |
| 5,120,476 A | 6/1992 | Scholz |
| 5,126,529 A | 6/1992 | Weiss et al. |
| 5,127,037 A | 6/1992 | Bynum |
| 5,134,569 A | 7/1992 | Masters |
| 5,136,515 A | 8/1992 | Helinski |
| 5,149,548 A | 9/1992 | Yamane et al. |
| 5,155,324 A | 10/1992 | Deckard et al. |
| 5,156,697 A | 10/1992 | Bourell et al. |
| 5,204,055 A | 4/1993 | Sachs et al. |
| 5,248,456 A | 9/1993 | Evans, Jr. et al. |
| 5,252,264 A | 10/1993 | Forderhase et al. |
| 5,284,695 A | 2/1994 | Barlow et al. |
| 5,342,919 A | 8/1994 | Dickens, Jr. et al. |
| 5,352,405 A | 10/1994 | Beaman et al. |
| 5,387,380 A | 2/1995 | Cima et al. |
| 5,398,193 A | 3/1995 | deAngelis |
| 5,503,785 A | 4/1996 | Crump et al. |
| 5,518,060 A | 5/1996 | Cleary et al. |
| 5,518,680 A | 5/1996 | Cima et al. |
| 5,555,176 A | 9/1996 | Menhennett et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,749,041 A | 5/1998 | Lakshminarayan et al. |
| 5,753,274 A | 5/1998 | Wilkening et al. |
| 5,824,250 A | 10/1998 | Whalen |
| 5,851,465 A | 12/1998 | Bredt |
| 5,884,688 A | 3/1999 | Hinton et al. |
| 5,902,537 A | 5/1999 | Almquist et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 6,048,188 A | 4/2000 | Hull et al. |
| 6,048,954 A | 4/2000 | Barlow et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,193,922 B1 | 2/2001 | Ederer |
| 6,210,625 B1 | 4/2001 | Matsushita |
| 6,217,816 B1 | 4/2001 | Tang |
| 6,243,616 B1 | 6/2001 | Droscher et al. |
| 6,259,962 B1 | 7/2001 | Gothait |
| 6,270,335 B2 | 8/2001 | Leyden et al. |
| 6,305,769 B1 | 10/2001 | Thayer et al. |
| 6,335,097 B1 | 1/2002 | Otsuka et al. |
| 6,375,874 B1 | 4/2002 | Russell et al. |
| 6,403,002 B1 | 6/2002 | Van Der Geest |
| 6,405,095 B1 | 6/2002 | Jang et al. |
| 6,423,255 B1 | 7/2002 | Hoechsmann et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,827,988 B2 | 12/2004 | Krause et al. |
| 6,830,643 B1 | 12/2004 | Hayes |
| 6,838,035 B1 | 1/2005 | Ederer et al. |
| 6,896,839 B2 | 5/2005 | Kubo et al. |
| 7,120,512 B2 | 10/2006 | Kramer et al. |
| 7,153,463 B2 | 12/2006 | Leuterer et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,455,805 B2 | 11/2008 | Oriakhi et al. |
| 7,497,977 B2 | 3/2009 | Nielsen et al. |
| 7,597,835 B2 | 10/2009 | Marsac |
| 7,641,461 B2 | 1/2010 | Khoshnevis |
| 7,790,096 B2 | 9/2010 | Merot et al. |
| 7,799,253 B2 | 9/2010 | Höschmann et al. |
| 8,186,415 B2 | 5/2012 | Marutani et al. |
| 8,574,485 B2 | 11/2013 | Kramer |
| 8,836,916 B2 | 9/2014 | Jamar et al. |
| 8,951,033 B2 | 2/2015 | Höchsmann et al. |
| 9,327,450 B2 | 5/2016 | Hein et al. |
| 9,643,359 B2 | 5/2017 | Baumann et al. |
| 10,792,757 B2 * | 10/2020 | Ackelid ................. B33Y 10/00 |
| 11,065,814 B2 | 7/2021 | Huang et al. |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0083771 A1 | 5/2003 | Schmidt |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0094058 A1 | 5/2004 | Kasperchik et al. |
| 2004/0112523 A1 | 6/2004 | Crom |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |

(56) References Cited

U.S. PATENT DOCUMENTS

| | | |
|---|---|---|
| 2005/0079086 A1 | 4/2005 | Farr |
| 2005/0093194 A1 | 5/2005 | Oriakhi et al. |
| 2005/0167872 A1 | 8/2005 | Tsubaki et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0276976 A1 | 12/2005 | Pfeifer et al. |
| 2005/0280185 A1 | 12/2005 | Russell et al. |
| 2006/0012058 A1 | 1/2006 | Hasei |
| 2006/0103054 A1 | 5/2006 | Pfeifer et al. |
| 2006/0105102 A1 | 5/2006 | Hochsmann et al. |
| 2006/0159896 A1 | 7/2006 | Pfeifer et al. |
| 2006/0175346 A1 | 8/2006 | Ederer et al. |
| 2006/0180957 A1 | 8/2006 | Hopkinson |
| 2006/0208388 A1 | 9/2006 | Bredt et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni |
| 2007/0057412 A1 | 3/2007 | Weiskopf et al. |
| 2007/0126157 A1 | 6/2007 | Bredt |
| 2007/0238056 A1 | 10/2007 | Baumann et al. |
| 2007/0241482 A1 | 10/2007 | Giller et al. |
| 2008/0001331 A1 | 1/2008 | Ederer |
| 2008/0003390 A1 | 1/2008 | Hayashi |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner et al. |
| 2008/0241404 A1 | 10/2008 | Allaman et al. |
| 2008/0260945 A1 | 10/2008 | Ederer et al. |
| 2008/0299321 A1 | 12/2008 | Ishihara |
| 2009/0068376 A1 | 3/2009 | Philippi et al. |
| 2010/0007048 A1 | 1/2010 | Schweininger |
| 2010/0007062 A1 | 1/2010 | Larsson et al. |
| 2010/0207288 A1 | 8/2010 | Dini |
| 2010/0212584 A1 | 8/2010 | Ederer et al. |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kahani-Shirazi |
| 2010/0323301 A1 | 12/2010 | Tang et al. |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2012/0046779 A1 | 2/2012 | Pax et al. |
| 2012/0057143 A1 | 3/2012 | Jamar et al. |
| 2012/0097258 A1 | 4/2012 | Harmann et al. |
| 2012/0113439 A1 | 5/2012 | Ederer et al. |
| 2012/0126457 A1 | 5/2012 | Abe et al. |
| 2012/0291701 A1 | 11/2012 | Grasegger et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0052291 A1 | 2/2013 | Morikawa |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2014/0048980 A1 | 2/2014 | Crump et al. |
| 2014/0065194 A1 | 3/2014 | Yoo |
| 2014/0212677 A1 | 7/2014 | Gnuchtel et al. |
| 2014/0227123 A1 | 8/2014 | Gunster |
| 2014/0271961 A1 | 9/2014 | Khoshnevis |
| 2014/0306379 A1 | 10/2014 | Hartmann et al. |
| 2015/0042018 A1 | 2/2015 | Gunther et al. |
| 2015/0110910 A1 | 4/2015 | Hartmann et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375419 A1 | 12/2015 | Gunther et al. |
| 2016/0236422 A1 | 8/2016 | Sakura |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2016/0318251 A1 | 11/2016 | Ederer et al. |
| 2016/0339644 A1 | 11/2016 | Sobue et al. |
| 2017/0050378 A1 | 2/2017 | Ederer |
| 2017/0072463 A1 | 3/2017 | Ng et al. |
| 2017/0080607 A1* | 3/2017 | Sahara .................. F21S 2/00 |
| 2017/0106595 A1 | 4/2017 | Gunther et al. |
| 2017/0151722 A1 | 6/2017 | Prasad et al. |
| 2017/0151727 A1 | 6/2017 | Ederer et al. |
| 2017/0157852 A1 | 6/2017 | Ederer et al. |
| 2017/0182711 A1 | 6/2017 | Gunther et al. |
| 2017/0210037 A1 | 7/2017 | Ederer et al. |
| 2017/0297263 A1 | 10/2017 | Ederer et al. |
| 2017/0305139 A1 | 10/2017 | Hartmann |
| 2017/0355137 A1 | 12/2017 | Ederer et al. |
| 2018/0017957 A1 | 1/2018 | Morovic et al. |
| 2018/0022923 A1 | 1/2018 | Emamjomeh et al. |
| 2018/0056393 A1 | 3/2018 | Herzog et al. |
| 2018/0065297 A1 | 3/2018 | Zhoa et al. |
| 2018/0079133 A1 | 3/2018 | Ederer et al. |
| 2018/0141271 A1 | 5/2018 | Gunter et al. |
| 2018/0193887 A1 | 7/2018 | Poucher et al. |
| 2018/0243883 A1 | 8/2018 | Brandl |
| 2018/0297284 A1 | 10/2018 | Fulop et al. |
| 2018/0326662 A1 | 11/2018 | Gunther et al. |
| 2018/0369910 A1 | 12/2018 | Gunter et al. |
| 2019/0047218 A1 | 2/2019 | Ederer et al. |
| 2019/0084229 A1 | 3/2019 | Gunther |
| 2019/0126555 A1 | 5/2019 | Lebed |
| 2019/0126607 A1 | 5/2019 | De Pena et al. |
| 2019/0160751 A1 | 5/2019 | Huang et al. |
| 2020/0004215 A1 | 1/2020 | Ramirez et al. |
| 2020/0055246 A1 | 2/2020 | Gunther et al. |
| 2020/0130263 A1 | 4/2020 | Gunther et al. |
| 2020/0141544 A1* | 5/2020 | Mitsuzuka ............. F21K 9/27 |
| 2020/0189259 A1 | 6/2020 | Hartmann et al. |
| 2020/0262141 A1 | 8/2020 | Ederer et al. |
| 2021/0316507 A1 | 10/2021 | Grasegger et al. |
| 2022/0219289 A1 | 7/2022 | Griesser et al. |
| 2022/0258412 A1 | 8/2022 | Scheck et al. |
| 2022/0288849 A1 | 9/2022 | Ederer et al. |
| 2022/0363000 A1 | 11/2022 | Heymel et al. |
| 2022/0371267 A1 | 11/2022 | Gnuchtel et al. |
| 2022/0379553 A1 | 12/2022 | Hoppman et al. |
| 2022/0402203 A1 | 12/2022 | Scheck et al. |
| 2022/0402209 A1 | 12/2022 | Heymel et al. |

FOREIGN PATENT DOCUMENTS

| | | |
|---|---|---|
| CN | 110142958 A | 8/2019 |
| DE | 3221357 A1 | 12/1983 |
| DE | 3930750 A1 | 3/1991 |
| DE | 4102260 A1 | 7/1992 |
| DE | 4305201 C1 | 4/1994 |
| DE | 4 325 573 A1 | 2/1995 |
| DE | 29506204 U1 | 6/1995 |
| DE | 4440397 C2 | 9/1995 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 A1 | 5/2000 |
| DE | 69634921 T2 | 12/2005 |
| DE | 201 22 639 U1 | 11/2006 |
| DE | 102006040305 A1 | 3/2007 |
| DE | 102006029298 A1 | 12/2007 |
| DE | 102007040755 A1 | 3/2009 |
| DE | 102007047326 A1 | 4/2009 |
| DE | 102011053205 A1 | 3/2013 |

(56) References Cited

FOREIGN PATENT DOCUMENTS

| | | | |
|---|---|---|---|
| DE | 202016003042 U1 | 7/2016 |
| DE | 102017200773 A1 | 7/2018 |
| EP | 0361847 A2 | 4/1990 |
| EP | 0431924 B1 | 6/1991 |
| EP | 0431924 A2 | 12/1991 |
| EP | 1415792 A2 | 5/2004 |
| EP | 1457590 A1 | 9/2004 |
| EP | 1648686 B1 | 4/2006 |
| EP | 1740367 B1 | 1/2007 |
| EP | 2202016 A1 | 6/2010 |
| EP | 2226683 A1 | 9/2010 |
| EP | 3202534 A1 | 7/2017 |
| EP | 3488996 A1 | 5/2019 |
| GB | 2297516 A | 8/1996 |
| GB | 2575544 A | 1/2020 |
| JP | S62275734 A | 11/1987 |
| JP | 2003/136605 A | 5/2003 |
| JP | 2004/082206 A | 3/2004 |
| JP | 2009/202451 A | 9/2009 |
| WO | 90/03893 A1 | 4/1990 |
| WO | 01/40866 A2 | 6/2001 |
| WO | 2004/014637 A1 | 2/2004 |
| WO | 2006/100166 A1 | 9/2006 |
| WO | 2008/049384 A1 | 5/2008 |
| WO | 2008/061520 A2 | 5/2008 |
| WO | 2011/063786 A1 | 6/2011 |
| WO | 2013/075696 A1 | 5/2013 |
| WO | 2014/090207 A1 | 6/2014 |
| WO | 2014/166469 A1 | 10/2014 |
| WO | 2016/019942 A1 | 2/2016 |
| WO | 2017/008777 A1 | 1/2017 |
| WO | 2017/049201 A1 | 3/2017 |
| WO | 2019/015707 A1 | 1/2019 |
| WO | 2019/027404 A1 | 2/2019 |

OTHER PUBLICATIONS

Armin Scharf, "Erster 3D-Endlosdrucker", zwomp.de, http://www.zwomp.de/2012/11/06/voxeljet-endlosdrucker/ dated Nov. 6, 2012.
Cima et al., "Computer-derived Microstructures by 3D Printing: Bio- and Structural Materials," SFF Symposium, Austin, TX, 1994.
EOS Operating Manual for Laser Sintering Machine with Brief Summary Feb. 22, 2005.
Feature Article—Rapid Tooling—Cast Resin and Sprayed Metal Tooling by Joel Segal, Apr. 2000.
Gebhart, Rapid Prototyping, pp. 118-119, 1996.
International Search Report and Written Opinion, PCT Application No. PCT/DE2020/000235, dated Jan. 25, 2021.
International Preliminary Report on Patentability, PCT Application No. PCT/DE2020/000235, dated Apr. 12, 2022.
Jacobs et al., 2005 SME Technical Paper, title "Are QuickCast Patterns Suitable for Limited Production?".
Marcus et al., Solid Freedom Fabrication Proceedings, Nov. 1993.
Marcus, et al., Solid Freeform Fabrication Proceedings, Sep. 1995, pp. 130-133.
Sachs et al., "Three-Dimensional Printing: Rapid Tooling and Prototypes Directly from a CAD Model", Massachusetts Institute of Technology, pp. 143-151, Jan. 1990.
Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.
Screen shots of URL: http://www.youtube.com/watch?v=hgIrNXZjIxU taken in approximately 5 second intervals on Nov. 12, 2015.
Williams, "Feasibility Study of Investment Casting Pattern Design by Means of Three Dimensional Printing", Department of Mechanical Engineering, abstract only; Sep. 25, 2001.
PCT International Search Report dated Jan. 25, 2021, Application No. PCT/DE2020/000235.

* cited by examiner

METHOD AND APPARATUS FOR PRODUCING 3D SHAPED ARTICLES USING HIGH-PERFORMANCE RADIATION EMITTERS

CLAIM OF PRIORITY

This application is a national phase filing under 35 USC § 371 from PCT Patent Application serial number PCT/DE2020/000235 filed on Oct. 8, 2020 and claim priority therefrom. This application further claims priority to German Patent Application Number DE 102019007073.9 filed on Oct. 11, 2019. International Patent Application number PCT/DE2020/000235 and German Patent Application number DE 102019007073,9 are each incorporated herein by reference in its entirety.

FIELD

The invention relates to a method and an apparatus for producing three-dimensional models using a high-performance radiation emitter.

BACKGROUND

European Patent EP 0 431 924 B1 describes a process for producing three-dimensional objects based on computer data. In the process, a thin layer of particulate material is deposited on a construction platform by means of a recoater and the particulate material (generally a fluid) has a binder material selectively printed thereon by means of a print head. The particulate region with the binder printed thereon bonds and solidifies under the influence of the binder and, optionally, an additional hardener. Next, the construction platform is lowered by one layer thickness in a construction cylinder and provided with a new layer of particulate material, the latter also being printed on as described above. These steps are repeated until a certain desired height of the object is achieved. Thus, the printed and solidified regions form a three-dimensional object (shaped article).

Upon completion, the object made of solidified particulate material is embedded in loose particulate material, from which it is subsequently freed. For this purpose, a suction device may be used, for example. This leaves the desired objects which then have to be freed from any residual powder, e.g. by brushing it off.

Upon completion, the object made of solidified particulate material is embedded in loose particulate material, from which it is subsequently freed. For this purpose, a suction device may be used, for example. This leaves the desired objects which then have to be freed from any residual powder, e.g. by brushing it off.

Other powder-based rapid prototyping processes (also referred to as layered construction of models or layer construction techniques), e.g. selective laser sintering or electron beam sintering, work in a similar manner, also applying loose particulate material layer by layer and selectively solidifying it with the help of a controlled physical source of radiation.

In the following, all these processes will be understood to be covered by the term "three-dimensional printing methods" or "3D printing methods".

3D printing on the basis of pulverulent materials and introduction of liquid binders is the quickest method among the layer construction techniques.

This method allows various particulate materials, including polymeric materials, to be processed. However, it has the disadvantage that the particulate material bed cannot exceed a certain bulk density, which is usually 60% of the particle density. The strength of the desired parts significantly depends on the achieved density, however. Insofar it would be required here for high strength of the parts to add 40% or more by volume of the particulate material in the form of the liquid binder. This is not only a relatively time-consuming process due to the single-droplet input, but it also causes many process-related problems, which are given, for example, by the inevitable shrinkage of the liquid volume during solidification.

In another embodiment, which is known in the art as "high-speed sintering" (HSS), solidification of the particulate material is effected by input of infrared radiation. The particulate material is thus bonded physically by a fusing process. In this case, advantage is taken of the comparatively poor absorption of thermal radiation in colorless plastic materials. Said absorption can be increased multiple times by introducing an IR acceptor (absorber) into the plastic material. The IR radiation can be introduced by various means, e.g. a bar-shaped IR lamp, which is moved evenly over the construction field. Selectivity is achieved by the specific printing of the respective layer with an IR acceptor. In the printed locations, the IR radiation thereby couples much better into the particulate material than in the unprinted regions. This results in selective heating within the layer beyond the melting point and, consequently, in selective solidification. This process is described, for instance, in EP1740367B1 and EP1648686B1.

The high speed sintering processes use emitters, which can have an influence on process control and affect the work results or the quality of the manufactured shaped articles. An important component here is the sintering assembly, which in one embodiment uses a short-wave or near-infrared radiation source to raise the temperature of the areas wetted with IR acceptor above the melting temperature of the particulate material, thus leading to solidification there. In a prior art embodiment, the particulate material surface wetted in some areas with IR acceptor is swept by means of this radiation source, with the emitter, designed as a linear emitter tube, arranged perpendicular to the direction of movement.

It is an object of the present invention to provide constructional means allowing an improved 3D printing method or at least helping to improve the disadvantages of the prior art or altogether avoiding the disadvantages of the prior art.

A further object of the present invention was to provide a method and an apparatus using an advantageous radiation emitter which results in improved work results.

BRIEF SUMMARY OF THE INVENTION

In one aspect, the invention relates to an apparatus, in particular a radiation-emitting set, suitable for producing 3D shaped articles or suitable for a 3D printing apparatus, wherein the radiation-emitting set comprises a plurality of radiation-emitting units which are mounted on a holding means which sweeps over the particulate material surface and wherein each radiation-emitting unit is mounted on the holding means at a defined angle of rotation alpha and the radiation-emitting units have different or the same defined angle(s) of rotation alpha or one or more radiation-emitting units have one defined angle of rotation alpha (group 1) and one or more radiation-emitting units have another defined angle of rotation alpha (group 2) and the radiation-emitting units are combined with one or more cooling means.

In another aspect, the disclosure relates to a 3D printing apparatus suitable for building 3D molded articles comprising at least one radiation-emitting set as described herein.

In a further aspect, the invention relates to a method for manufacturing 3D shaped articles using a radiation-emitting set as described herein.

DETAILED DESCRIPTION OF THE INVENTION

Figure 1:
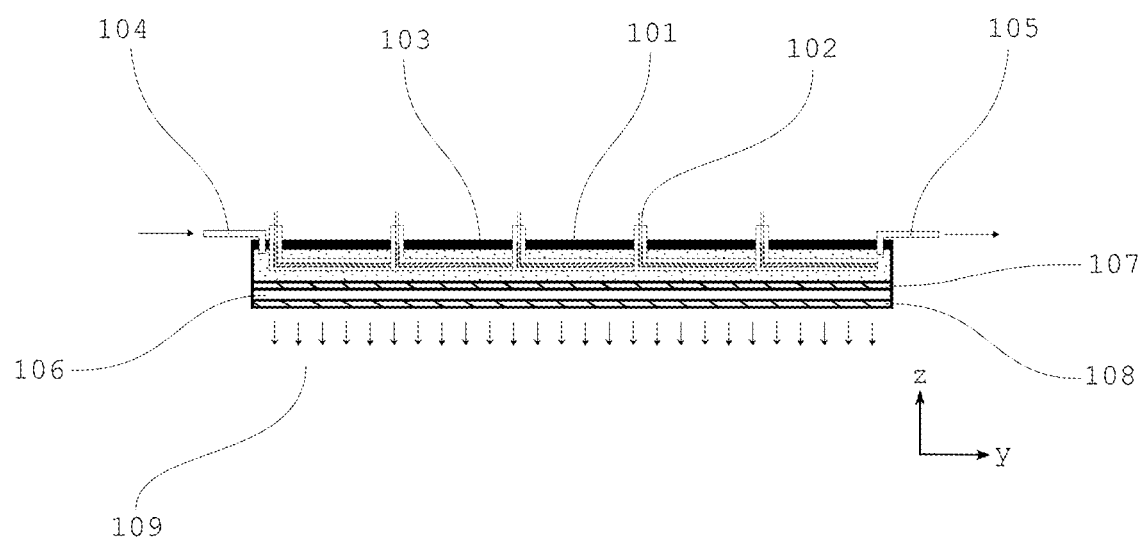
FIG. 1 shows an example of a sinter radiation-emitting set viewed from the side in the yz plane.

According to the invention, an object underlying the application is achieved by an apparatus according to claim 1 or/and by a method according to claim 12. Further preferred aspects are described in the subclaims.

First of all, several terms of the disclosure will be explained in more detail below.

A "3D shaped article", "molded article" or "part" in the sense of the disclosure means any three-dimensional object manufactured by means of the method according to the invention or/and the apparatus according to the invention and exhibiting dimensional stability.

"Construction space" is the geometric location where the particulate material bed grows during the construction process by repeated coating with particulate material or through which the bed passes when applying continuous principles. The construction space is generally bounded by a bottom, i.e. the construction platform, by walls and an open top surface, i.e. the construction plane. In continuous principles, there usually are a conveyor belt and limiting side walls. The construction space can also be designed in the form of what is called a job box, which constitutes a unit that can be moved in and out of the apparatus and allows batch production, with one job box being moved out after completion of a process to allow a new job box to be moved into the apparatus immediately, thereby increasing both the production volume and, consequently, the performance of the apparatus.

The "particulate materials" or "particulate construction materials" or "construction materials" or "fluid" of use herein may be any materials known for powder-based 3D printing, in particular polymers, ceramics and metals. The particulate material is preferably a free-flowing powder when dry, but may also be a cohesive, cut-resistant powder or a particle-charged liquid. In this specification, particulate material and powder are used synonymously.

The "particulate material application" is the process of generating a defined layer of powder. This may be done either on the construction platform or on an inclined plane relative to a conveyor belt in continuous principles. The particulate material application will also be referred to below as "recoating".

"Selective liquid application" in the sense of the disclosure may be effected after each particulate material application or irregularly, depending on the requirements for the molded article and for optimization of the molded article production, e.g. several times with respect to particulate material application. In this case, a sectional image of the desired article is printed.

The "apparatus" used for carrying out a method according to the disclosure may be any known 3D-printing apparatus which includes the required parts. Common components include recoater, construction field, means for moving the construction field or other parts in continuous processes, metering devices and heating and irradiating means and other parts which are known to the person skilled in the art and will therefore not be described in detail herein.

The construction material according to the disclosure is always applied in a "defined layer" or "layer thickness", which is individually adjusted according to the construction material and the process conditions. It is, for example, 0.05 to 5 mm, preferably 0.07 to 2 mm.

A "recoater" within the meaning of the disclosure is a device part that can receive fluid, e.g., particulate material such as mineral, metallic or plastic materials, wood in the form of particles, or mixtures thereof, and dispenses or applies it layerwise in a controlled manner onto a construction platform of a 3D apparatus. The recoater can be elongated and the particulate material is located in a reservoir above an outlet opening.

A "reservoir" in the sense of the disclosure is to be understood as the part of a recoater into which the particulate material is filled and from which it is dispensed and applied onto the construction platform of the 3D apparatus in a controlled manner via an outlet opening.

A "coating blade" as defined in the disclosure is a substantially flat part made of metal or other suitable material, which is located at the outlet opening of the recoater and through which the fluid is discharged onto the construction platform and is smoothed down. A recoater may have one or two or more coating blades. A coating blade can be an oscillating blade that performs oscillations in the sense of a rotary motion when excited. Further, this oscillation can be switched on and off by a means for generating oscillations.

Depending on the arrangement of the outlet opening, the coating blade is arranged "substantially horizontally" or "substantially vertically" within the meaning of the disclosure.

A "radiation-emitting set" as used in the disclosure means an assembly of radiation-emitting units arranged in a defined manner at their angle of rotation alpha, wherein each radiation-emitting unit or a group of radiation emitter units may have the same angle alpha.

A "radiation-emitting unit" as used in the disclosure means a unit that may be rotatably disposed and emits light of a particular spectrum.

The "angle of rotation alpha" as used in the disclosure means the angle at which a radiation-emitting unit is disposed in the radiation-emitting set, with the reference plane oriented perpendicular to the direction of movement of the radiation-emitting set across the particulate material surface.

In this context, each radiation-emitting unit can be arranged in a radiation-emitting set at a different or the same angle, and different groups of radiation-emitting units can also be formed in this case according to the angles alpha, e.g. group 1, group 2, etc.

"Group 1" or "group 2" up to "group n" in the sense of the disclosure are groups of radiation-emitting units which form the same angle.

A "coolant" as used in the disclosure is a means capable of cooling a radiation-emitting unit, such as water or other liquid or a blower air flow.

A "peripheral area" as used in the disclosure means the region of a radiation-emitting set that is located at the edge of the radiation-emitting set and can be delineated from the interior area. In this case, the peripheral area and the interior area form the total area of the radiation-emitting unit in terms of its surface on which the radiation-emitting units are mounted.

The "interior area" as used in the disclosure means the area of a radiation-emitting set that is inside the radiation-emitting set and can be delineated from the peripheral area.

A "spectrum converter" as used in the disclosure is a means that shifts the spectrum of emitted light. This may be water, for example.

"Radiation intensity" as used in the disclosure means the power of electro-magnetic radiation emitted per area under consideration by an emitter of electro-magnetic radiation such as a radiation-emitting unit, a group of radiation-emitting units, or a radiation-emitting set.

"Short wavelength spectrum" as used in the disclosure means electromagnetic radiation of a substantially Planckian spectrum with a wavelength maximum of 1.2 μm or less.

"Near-infrared region" as used in the disclosure means electromagnetic radiation of a wavelength of 1 μm or less.

"Uniform spectrum" of a group of radiation-emitting units, according to the disclosure, means substantially coincident wavelength distribution of a Planckian radiation spectrum or identical wavelength maximum.

"Radiation spectrum" as used in the disclosure means an ensemble of wavelengths of emitted electro-magnetic radiation, particularly in the form of a Planckian radiation distribution.

"Continuous radiation intensity", as used in the disclosure, means a seamless combination of emitted power from a radiation-emitting unit into a coherent ensemble on a surface.

"Layer data" refers to the cutting data required to build up a molded article layer by layer, which data is calculated in advance from the virtual digitally available molded article data.

"Filament temperature" or "coil temperature" means the generated temperature of a wire element heated by applying an electrical voltage and located in a glass bulb, which wire element is usually designed as a coil.

Further aspects of the invention will be described in more detail below.

The object underlying the application is achieved, in particular, by a radiation-emitting set, suitable for a 3D printing apparatus, wherein the radiation-emitting set comprises a plurality of radiation-emitting units which are mounted on a holding means and wherein each radiation-emitting unit is mounted on the holding means at a defined angle of rotation alpha and the radiation-emitting units have different or the same defined angle(s) of rotation alpha or one or more radiation-emitting units have one defined angle of rotation alpha (group 1) and one or more radiation-emitting units have another defined angle of rotation alpha (group 2) and the radiation-emitting units are combined with one or more cooling means.

The angle of rotation alpha can be set differently depending on the requirements in the peripheral area and in the interior area of the radiation-emitting set, whereby by modifying the angle of rotation the power input can be varied in different areas and thus optimized. It can be advantageous if the angle of rotation alpha in the peripheral area of the radiation-emitting set is larger than in the interior area of the radiation-emitting set.

It may also be desirable, for example, to select different radiation intensities in different areas. For example, it can be advantageous if the radiation intensity in the peripheral area of the radiation-emitting set(s) is set higher than in the interior area of the radiation-emitting set.

Other parameters can also be selected in a certain way, e.g. it can be advantageous if the peripheral area in the radiation-emitting set corresponds to the distance of the radiation-emitting set to its construction surface.

The radiation-emitting set can be combined with further means, e.g. the radiation-emitting units can be combined with a spectrum converter.

It can also be advantageous if the radiation-emitting units are cooled, e.g. the radiation-emitting units can be flushed with a coolant, preferably in their entirety, preferably the radiation-emitting units can be flushed directly.

In this case, the coolant can be, for example, water or/and a spectrum converter.

The spectrum emitted is selected according to requirements, and it may be advantageous for the radiation-emitting set to emit essentially a short-wave spectrum.

In a radiation-emitting set according to the disclosure, the spectrum is selected depending on the construction requirements, and it may be advantageous for the radiation-emitting set to produce a substantially uniform spectrum on the construction field.

Radiation-emitting units may be selected according to requirements, and it may be advantageous for the radiation-emitting units to be substantially L-shaped.

In another aspect, the disclosure relates to a 3D printing apparatus suitable for building 3D shaped articles, said apparatus comprising at least one radiation-emitting set as described above.

In another aspect, the disclosure relates to a method for building 3D shaped articles using at least one radiation-emitting set as described above.

In a further aspect, individual radiation-emitting units, preferably a group of radiation emitters, are wired with different electrical power from each other.

Furthermore, it can be advantageous to measure the energy input of a group of radiation-emitting units by means of a non-contact temperature sensor and to control the radiation intensity of the group by means of the measured value. In this case, the temperature before and after the radiation-emitting set passes over a defined area is measured by one measuring means each.

An advantageous arrangement of the radiation-emitting units is in the form of a gapless sequence, so that an uninterrupted field of continuous radiation intensity results.

In this case, by rotating the radiation-emitting units by an angle alpha, it is possible to nest several ensembles of a group of radiation-emitting units to each other, thus enabling an increase in the emitted radiation intensity.

It can be advantageous to use radiation-emitting units of different sizes, e.g. to achieve a higher radiation intensity by means of shorter radiation-emitting units at the sides of the radiation-emitting set and thus to compensate for edge effects which are caused by a reduction of the radiation intensity at the sides of the radiation-emitting units. This is due to the fact that the radiation-emitting units are located at a certain defined distance from the irradiated surface and are limited in their extent. Both of these factors result in blurring at the edges of the generated radiation field. Since the temperature of the irradiated surface correlates directly with the radiation intensity, this leads to undesirable inhomogeneities of the temperature, which has direct negative effects on the sintering process, cf. FIG. 5-1.

Including the calculated layer data in the shaping process in additive manufacturing allows a group of radiation-emitting units to be switched off in a targeted manner at the points where no molded article is to be generated. Thus, unnecessary degradation due to a temperature increase of the irradiated particulate material can be counteracted. In addition, this advantageously also allows to save energy.

By using a spectrum converter and dissipating the filtered energy, it is possible to adjust the emitted spectrum of the radiation-emitting set or a group of radiation emitters or a single radiation-emitting unit independently of the radiation power. This allows for advantageous, more wide-area control of the radiation intensity.

In another aspect, it may be advantageous to cascade multiple spectrum converters to achieve a stronger conversion effect or to filter multiple specific unfavorable wavelength ranges.

Instead of a spectrum converter, it may be advantageous in some processes to use a highly transparent material. A spectrum converter and a transparent material as protection against contact and dust may also be preferably used.

It can be advantageous to use efficient cooling to generate much higher filament temperatures in the radiation-emitting units by means of increased voltage than is customary in the trade. According to Wien's displacement law, this shifts the emitted radiation spectrum to shorter wavelengths advantageous for the high-speed sintering process. Furthermore, this can increase the emitted radiation intensity per radiation-emitting unit.

Efficient cooling of the radiation-emitting units is also preferable in order to increase the service life of the radiation-emitting units.

EXAMPLES

Shown by way of example in FIG. 1 is a sinter radiation-emitting set 101 viewed from the side in the yz plane. Commercially available L-shaped emitter tubes 102 are placed seamlessly together or optionally rotated through an in-plane angle so that when viewed from the side, a seamless combination is formed. The short side of the emitters, where the electrical supply lines are located, is led out from the top of the radiation-emitting set. The tubes are also immersed in a cooling medium 103, which is continuously exchanged via supply and discharge lines 104/105. The waste heat generated by the emitter tubes 102 is thus dissipated and the secondary radiation caused by heating of the radiation emitter glass body is suppressed. Not only can cooling greatly increase the life of the radiation emitters by keeping the molybdenum feedthrough at the constricted part of the glass below the critical temperature of approx. 350° C., but at the same time the coil temperature inside the radiation emitter can be increased, shifting the spectrum of emitted electromagnetic radiation toward desirable smaller wavelengths. The emitted radiation spectrum is directly related to the coil temperature (so-called Wien's displacement law). Instead of a filament color temperature of 2400 K, more than 2900 K are thus possible, which corresponds, for example, to the radiation spectrum in the near-infrared range desired in the high-speed sintering process. The container of the cooling liquid is sealed on its underside by a material 107 that is transparent to a certain spectrum of radiation. For example, borosilicate glass can be used. The underside of the sintering unit forms another radiation-transmitting material 108 which, in addition to a possible filtering property, fulfills the function of dust and contact protection. There is a gap 106 between the two materials. The electromagnetic radiation 109 can escape at the underside of the apparatus.

Figure 2:
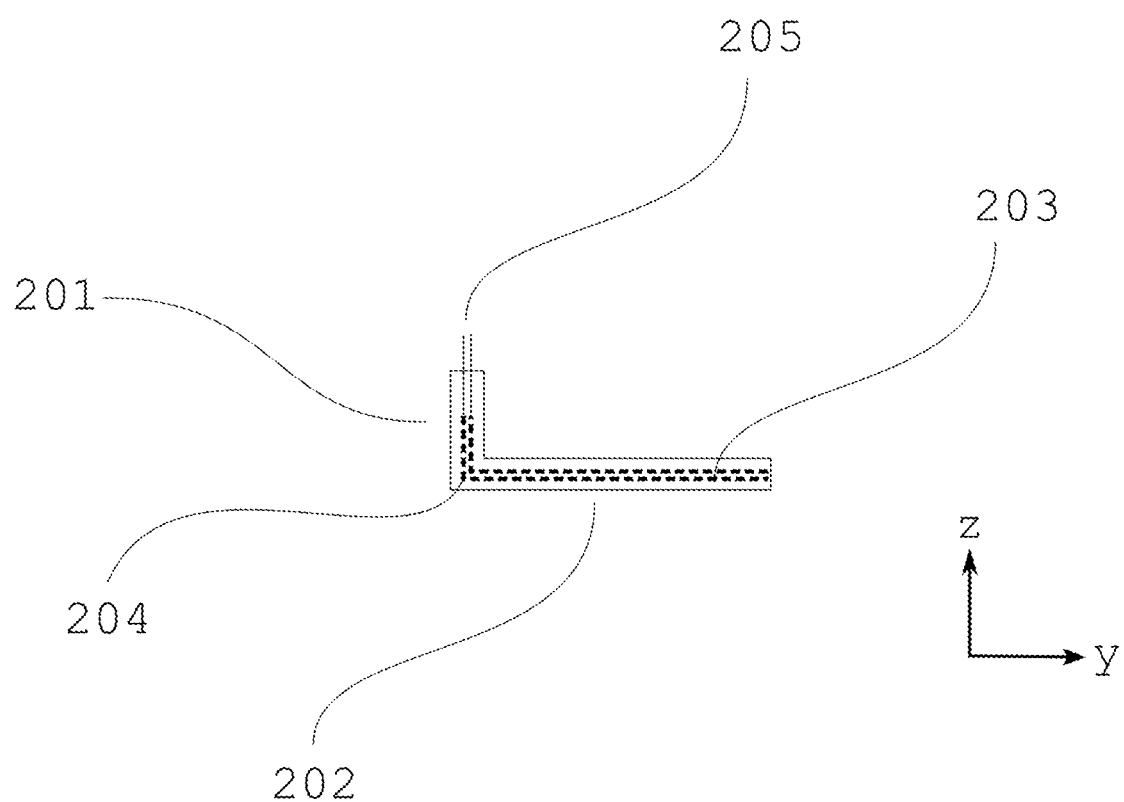
FIG. 2 is an exemplary schematic representation of a commercially available IR emitter in L-shape.

FIG. 2 is a schematic representation of a commercially available IR emitter 201 in L-shape. Here, the coil 203 which follows the glass bulb 202 is guided around the edge 204, so that the electrical feedthrough 205 is located at the top of the radiation emitter. This allows the emitters to be placed next to each other with almost no gaps.

Figure 3:
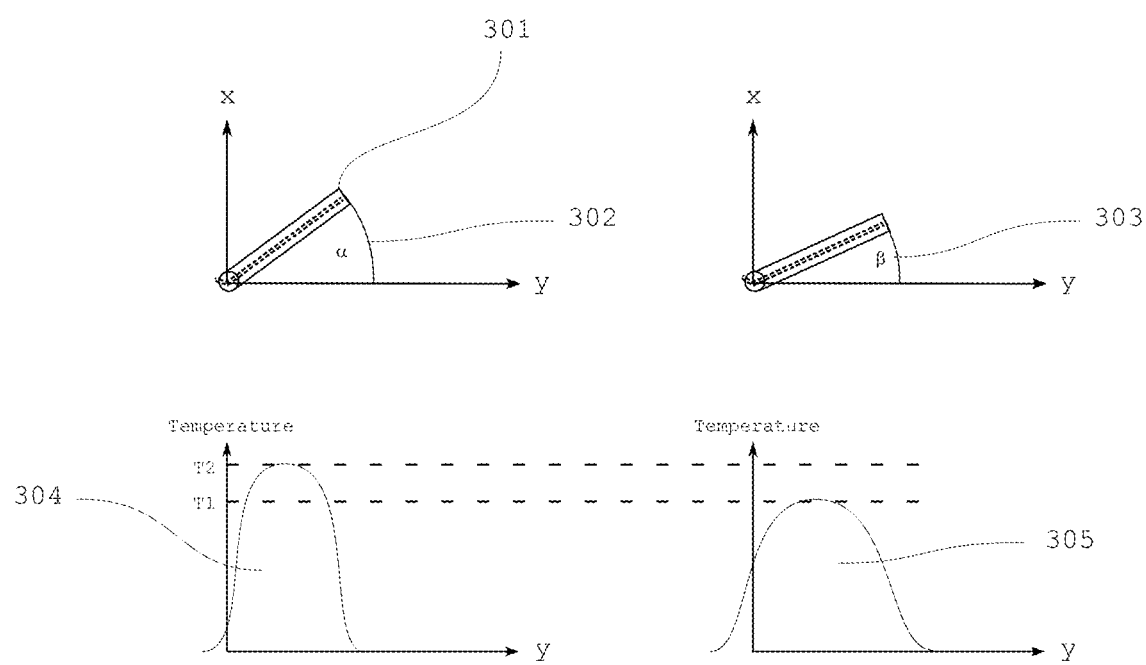
FIG. 3 is an exemplary schematic representation of the effects of the rotation of a radiation emitter at its suspension point in the xy-plane.

FIG. 3 is a schematic representation of the effects of rotating a radiation emitter 301 at its suspension point in the xy plane. If the radiation emitter is moved in x-direction over a surface, the emitted radiation is concentrated on a smaller surface the larger the angle is chosen. Thus, larger rotation angles 302 result in a higher temperature T2, 304 on the construction field. Smaller angles beta, 303 lead to a lower resulting temperature T1. The intensity of the radiation is in a relation of I=[1/cos alpha], the ratio of both temperatures in a rough approximation is in the order of dT=[1/cos alpha]^¼.

Figure 4:
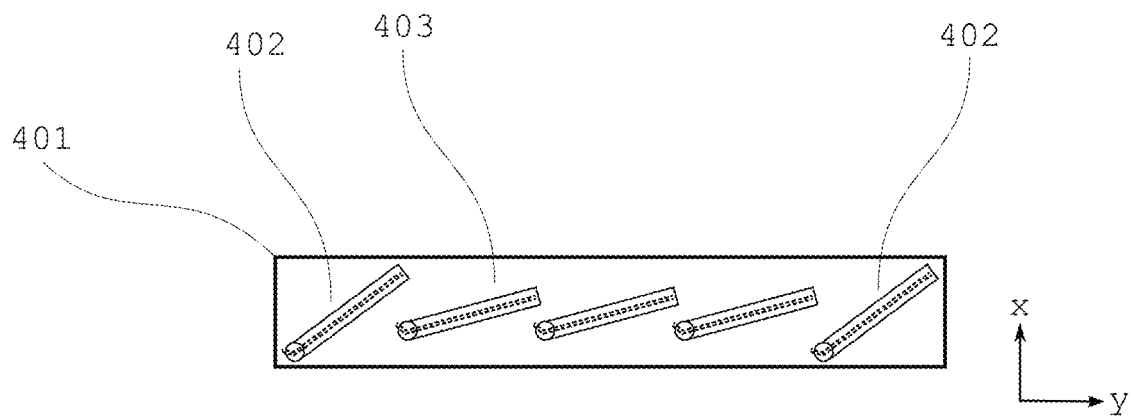
FIG. 4 shows an example of a sinter radiation-emitting set corresponding to FIG. 1 with emitter tubes rotated as an example, viewed here from below in the xy plane.

FIG. 4 shows a sinter radiation-emitting set corresponding to FIG. 1 with emitter tubes rotated as an example, viewed here from below in the xy plane. The outer radiation emitters 402 are more rotated than the inner ones 403, so that a higher radiation concentration is achieved at the edges.

Figure 5:
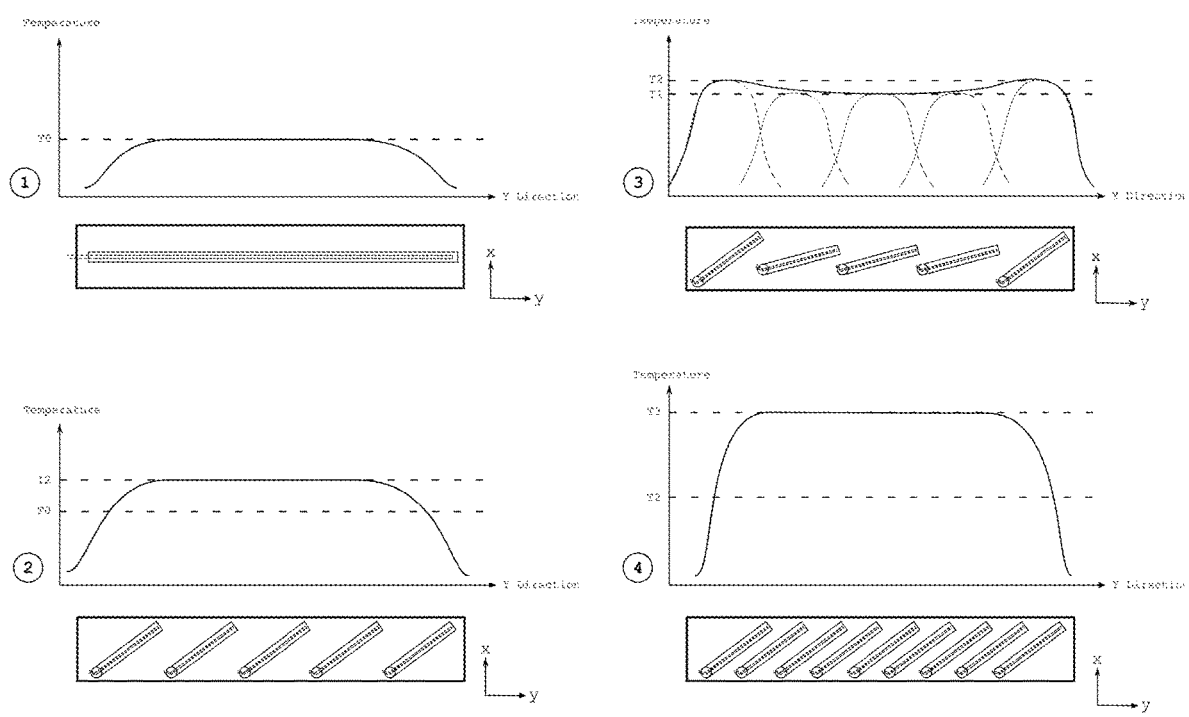
FIG. 5 shows an exemplary arrangement of emitter tubes within the sinter radiation-emitting set in exemplary embodiments.

FIG. 5 describes the following:
1. Resulting temperature distribution on the construction field along the Y-axis with a conventional prior art sinter radiation-emitting set. The peripheral areas receive less radiation intensity, which results in lower temperatures on the irradiated surface. The reason for this is the unfocused optical image of the radiation emitters on the irradiated surface, which corresponds approximately to the root of a Gaussian distribution function, where normalized sigma roughly follows the distance of the emitter tube to said surface. As a rule of thumb, an extension by the distance of the radiation emitter to the construction field on both sides has been established.
   Lower temperatures are reflected by reduced mechanical stability and quality of the molded articles produced. To compensate for this, the radiation emitter must be built much longer than the width of the construction field. This leads not only to an increase in the size of the entire set, but also to parts of the apparatus being heated by the radiation emitter that are outside the area to be irradiated, which is usually undesirable. In addition, the space in the apparatus is often limited. This means that larger parts of the construction field have to remain unused, which has a negative effect on productivity and material consumption. In addition, proportionally more energy is required for this.
2. By rotating and seamlessly aligning smaller emitter tubes, the energy input and thus the resulting temperature on the construction field can be adjusted independently of the radiation spectrum. Each rotated emitter tube produces a temperature distribution on the construction field which follows a Gaussian distribution, see the distribution of the large radiation emitter in (1). When the radiation emitters are seamlessly aligned, the addition of the Gaussian curves results in exactly one straight line. In the example, this can result in a temperature T2 that is higher than T0 in (1). Unlike in (1), not only the resulting temperature but also the total energy and thus the length of the radiation emitter can be scaled arbitrarily, which would require a customer-specific adaptation of the emitter tube according to the prior art.

3. A combination of a seamless sequence of emitter tubes with different angles of rotation from each other allows temperature adjustment in the Y-direction and thus compensation of the edge effects, whereby energy can be introduced in a more targeted manner and the size of the sinter radiation-emitting set can be reduced. To compensate for edge effects in the form of temperature losses, a higher temperature T2 is set at the sides of the construction field than in the center, where a temperature of T1 is sufficient.

4. By rotating the smaller emitter tubes, the energy density can be greatly increased. High energy densities are possible when using the cooling concept of FIG. 1. Thus, a much higher temperature of T3 can be achieved on the construction field. According to the prior art, the maximum energy of a long single radiation emitter is limited to approx. 15A at 400V by the line feed-through at the glass bulb by means of molybdenum plates, so that T0 is the maximum temperature that can be reached. Although similarly high temperatures could theoretically be achieved by staggered stacking upwards in the Z direction of conventional, long and unrotated radiation emitters, this would be difficult to realize in practice, since above a certain length this would entail very thin and thus shock-sensitive wire windings in the radiation-emitting units. In addition, radiation-emitting units built in this way would not be competitive in terms of price due to the customization required.

Figure 6:
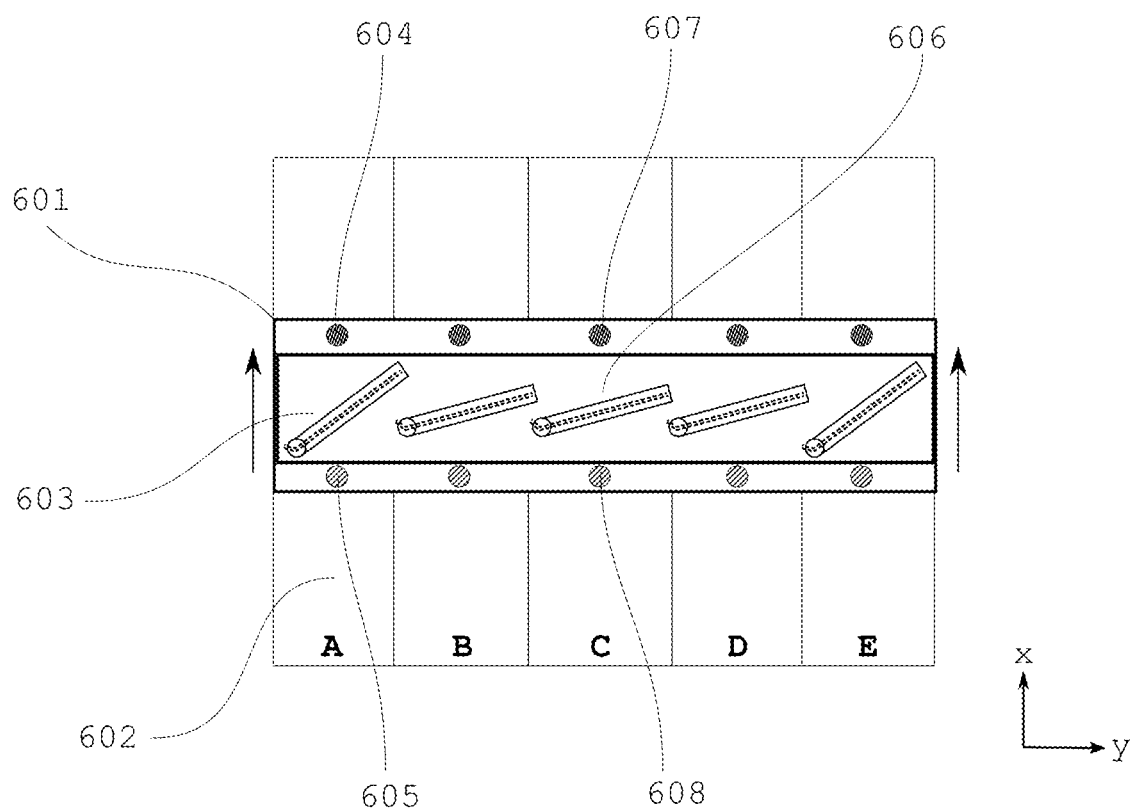
FIG. 6 is a top view of the radiation-emitting set in the xy-plane with single emitter tubes rotated and while passing over the construction field, pointing upwards in this case.

FIG. 6 shows a top view of the radiation-emitting set 601 in the xy-plane with rotated single emitter tubes 603 and 606, while passing over the construction field, pointing upwards in this case. Temperature sensors 604, 605, 607, and 608 are attached to the set 601. Each individual emitter is assigned its swept construction field area A to E. By means of temperature sensors, e.g. infrared pyrometers, it is possible to determine for each corresponding area A to E the temperature resulting from the energy introduced into the construction field by each radiation emitter, both before and after exposure. In this case, the sensor pair 604 and 605 measures the track of the first emitter on area A, etc.

Figure 7:
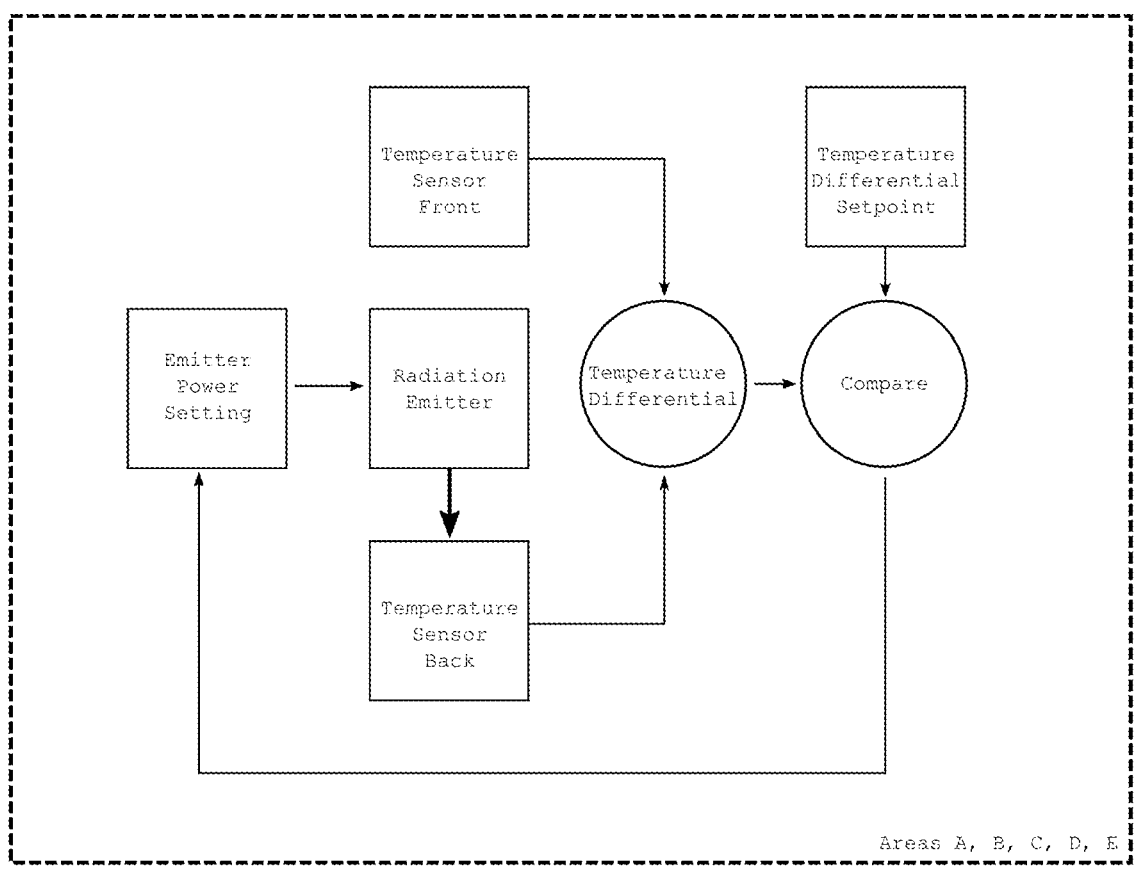
FIG. 7 shows a block diagram of an exemplary embodiment of a rudimentary control algorithm for controlling the set power of each individual emitter to achieve a desired temperature distribution on the construction field.

FIG. 7 shows a block diagram of an exemplary embodiment of a rudimentary control algorithm for controlling the set power of each emitter to achieve a desired temperature distribution on the construction field.

The difference between the temperatures before and after exposure is compared with a target value and, on the basis of this, a power adjustment of the individual radiation emitters to each corresponding area, A to E here, by way of example, is calculated and carried out. The target values can be permanently stored or follow a specific algorithm so that it is possible to specifically exclude parts of the construction field from the exposure process. The aging of the particulate material on the construction field caused by the temperature increase when irradiated by the radiation emitters can thus be limited. This leads to an increased recycling rate of the particulate material, and thus to savings in costs related to material consumption.

| LIST OF REFERENCE NUMERALS |   |
|---|---|
| FIG. 1 | |
| 101 | Exemplary embodiment of a sinter radiation-emitting set |
| 102 | Commercially available emitter tube with seamless transition |
| 103 | Cooling liquid in a constant flow, which also acts as a radiation filter, e.g. demin. water. In another embodiment, gases or compressed air can also be used. |
| 104 | Supply of the liquid |
| 105 | Return of the liquid |
| 106 | Gap designed to minimize heat transfer |
| 107 | Material transparent to filtered radiation and/or spectrum converter as container boundary for liquid, e.g. temperature-resistant borosilicate glass |
| 108 | Material transparent to filtered radiation to protect against contamination, e.g. temperature-resistant borosilicate glass or spectrum converter |
| 109 | Filtered electromagnetic radiation, for example very near-infrared <1 μm |
| FIG. 2 | |
| 201 | Example of a commercially available emitter tube in a section along YZ plane |
| 202 | Glass bulb of the emitter tube, in an L-shaped example |
| 203 | Heating coil following the shape of the glass bulb |
| 204 | Kink in emitter tube without interruption of the heating coil |
| 205 | Electrical feed-through and connection of the heating coil |
| FIG. 3 | |
| 301 | Top view of emitter tube |
| 302 | In-plane rotation by the angle alpha |
| 303 | In-plane rotation by the angle beta, with beta < alpha |
| 304 | Larger angle of rotation alpha leads to higher temperature and smaller width of irradiation |
| 305 | Smaller angle of rotation beta results in lower temperature |
| FIG. 4 | |
| 401 | Exemplary embodiment of a sinter radiation-emitting set viewed from below, xy-plane |
| 402 | Emitter tube rotated in plane |
| 403 | Emitter tube rotated by a different, smaller angle in the xy-plane, and connecting seamlessly |
| FIG. 5 | |
| 5-1 | Resulting temperature distribution on the construction field along the Y-axis with a conventional prior art sinter radiation-emitting set, which is able to achieve a maximum temperature T0. |
| 5-2 | By rotating and seamlessly lining up smaller emitter tubes, the energy input and thus the resulting temperature T2 on the construction field can be adjusted independently of the radiation spectrum. |
| 5-3 | A combination of a seamless sequence of emitter tubes with different angles of rotation from each other allows temperature adjustment in the Y-direction and thus compensation of the edge effects, whereby energy can be introduced in a more targeted manner and the size of the sinter radiation-emitting set can be reduced. |
| 5-4 | By rotating the smaller emitter tubes, the energy density can be greatly increased. Thus, a much higher temperature of T3, compared to T2 of FIG. 5-2, can be achieved on the construction field. |
| FIG. 6 | |
| 601 | Sinter radiation-emitting set is moved over construction field, which is divided into areas A to E |
| 602 | Area A on the construction field covered by radiation emitter 403 passing over it. |
| 603 | Rotated emitter tube |
| 604 | Pyrometer directed to area A on the construction field measures the construction field temperature before the sinter radiation-emitting set passes over it |
| 605 | Pyrometer directed at area A on the construction field measures the construction field temperature after the sinter radiation-emitting set has passed over it |

| | LIST OF REFERENCE NUMERALS |
|---|---|
| 606 | Further rotated emitter tube, shown here at a different angle by way of example |
| 607 | Exemplary pyrometer directed at area C on the construction field measures the construction field temperature before the sinter radiation-emitting set passes over it |
| 608 | Exemplary pyrometer directed at area C on the construction field measures the construction field temperature after the sinter radiation-emitting set has passed over it |
| | FIG. 7 |
| | Block diagram of an exemplary embodiment of a rudimentary control algorithm for controlling the set power of each individual emitter to achieve a desired temperature distribution on the construction field. |

What is claimed is:

1. A radiation-emitting set, suitable for a 3D printing apparatus, wherein the radiation-emitting set comprises a plurality of radiation-emitting units which are mounted on a holder and wherein each radiation-emitting unit is mounted on the holder at a defined angle of rotation alpha and the radiation-emitting units have different or the same defined angle(s) of rotation alpha or one or more radiation-emitting units have one defined angle of rotation alpha (group 1) and one or more radiation-emitting units have another defined angle of rotation alpha (group 2) and the radiation-emitting units are combined with one or more coolers;
   wherein each radiation-emitting unit is an elongated structure having an axis;
   wherein the defined angle of rotation alpha for each radiation-emitting unit is a rotation of the axis of the radiation-emitting unit about a z-axis, is measured relative to a y axis, and is an acute angle;
   wherein at least one angle of rotation alpha in a peripheral area of the radiation-emitting set is larger than in an interior area of the radiation-emitting set.

2. The radiation-emitting set of claim 1, wherein the radiation-emitting units are combined with a glass spectrum converter.

3. The radiation-emitting set according to claim 2, wherein the radiation-emitting units are flushed with a coolant, optionally in their entirety.

4. The radiation-emitting set according to claim 3, wherein the coolant is water or/and a spectrum converter.

5. The radiation-emitting set according to claim 2, wherein the radiation-emitting set emits a substantially short-wave spectrum.

6. The radiation-emitting set according to claim 5, wherein the one or more coolers comprises water.

7. The radiation-emitting set according to claim 5, wherein the one or more coolers comprises a spectrum converter.

8. The radiation-emitting set of claim 1, wherein the radiation-emitting set produces a substantially uniform spectrum on a construction field.

9. The radiation-emitting set of claim 1, wherein the radiation-emitting set includes a substantially L-shaped radiation-emitting unit.

10. The radiation-emitting set of claim 1, wherein the radiation-emitting units have the same defined angle(s) of rotation alpha.

11. The radiation-emitting set of claim 1, wherein the radiation-emitting units have different defined angle(s) of rotation alpha.

12. The radiation-emitting set of claim 1, wherein one or more of the radiation-emitting units have one defined angle of rotation alpha (group 1) and one or more of the radiation-emitting units have another defined angle of rotation alpha (group 2).

13. The radiation-emitting set of claim 12, wherein the one or more coolers includes a flow of a liquid that acts as a radiation filter.

14. The radiation-emitting set of claim 1, wherein a radiation intensity in the peripheral area of the radiation-emitting set(s) is set higher than in the interior area of the radiation-emitting set.

15. The radiation-emitting set according to claim 1, wherein the radiation-emitting set is for selectively melting a particulate material that has been printed with an IR acceptor.

16. The radiation-emitting set of claim 1, wherein the radiation-emitting units are mounted to a surface of the holder wherein the surface is substantially normal to the z-axis.

17. A 3D printing apparatus suitable for building up 3D shaped articles, said apparatus comprising at least one radiation-emitting set according to claim 1.

18. A method for building up a 3D shaped article, comprising a step of heating a construction field with at least one radiation-emitting set according to claim 1.

19. The method of claim 18,
   wherein a radiation intensity in the peripheral area of the radiation-emitting set(s) is set higher than in the interior area of the radiation-emitting set.

20. A radiation-emitting set, suitable for a 3D printing apparatus, wherein the radiation-emitting set comprises a plurality of radiation-emitting units which are mounted on a holder and wherein each radiation-emitting unit is mounted on the holder at a defined angle of rotation alpha and the radiation-emitting units have different or the same defined angle(s) of rotation alpha or one or more radiation-emitting units have one defined angle of rotation alpha (group 1) and one or more radiation-emitting units have another defined angle of rotation alpha (group 2) and the radiation-emitting units are combined with one or more coolers;
   wherein each radiation-emitting unit is an elongated structure having an axis;
   wherein the defined angle of rotation alpha for each radiation-emitting unit is a rotation of the axis of the radiation-emitting unit about a z-axis, is measured relative to a y axis, and is an acute angle;
   wherein a radiation intensity in a peripheral area of the radiation-emitting set(s) is set higher than in an interior area of the radiation-emitting set.

\* \* \* \* \*